April 14, 1970  H. R. SHAFFER  3,506,941
THERMAL TRIPPING DEVICE FOR CIRCUIT BREAKER
Filed Sept. 13, 1967  4 Sheets-Sheet 1

INVENTOR.
HOWARD R. SHAFFER
BY
OSTROLENK, FABER, GERB & SOFFEN
ATTORNEYS

INVENTOR.
HOWARD R. SHAFFER
BY
OSTROLENK, FABER, GERB & SOFFEN
ATTORNEYS

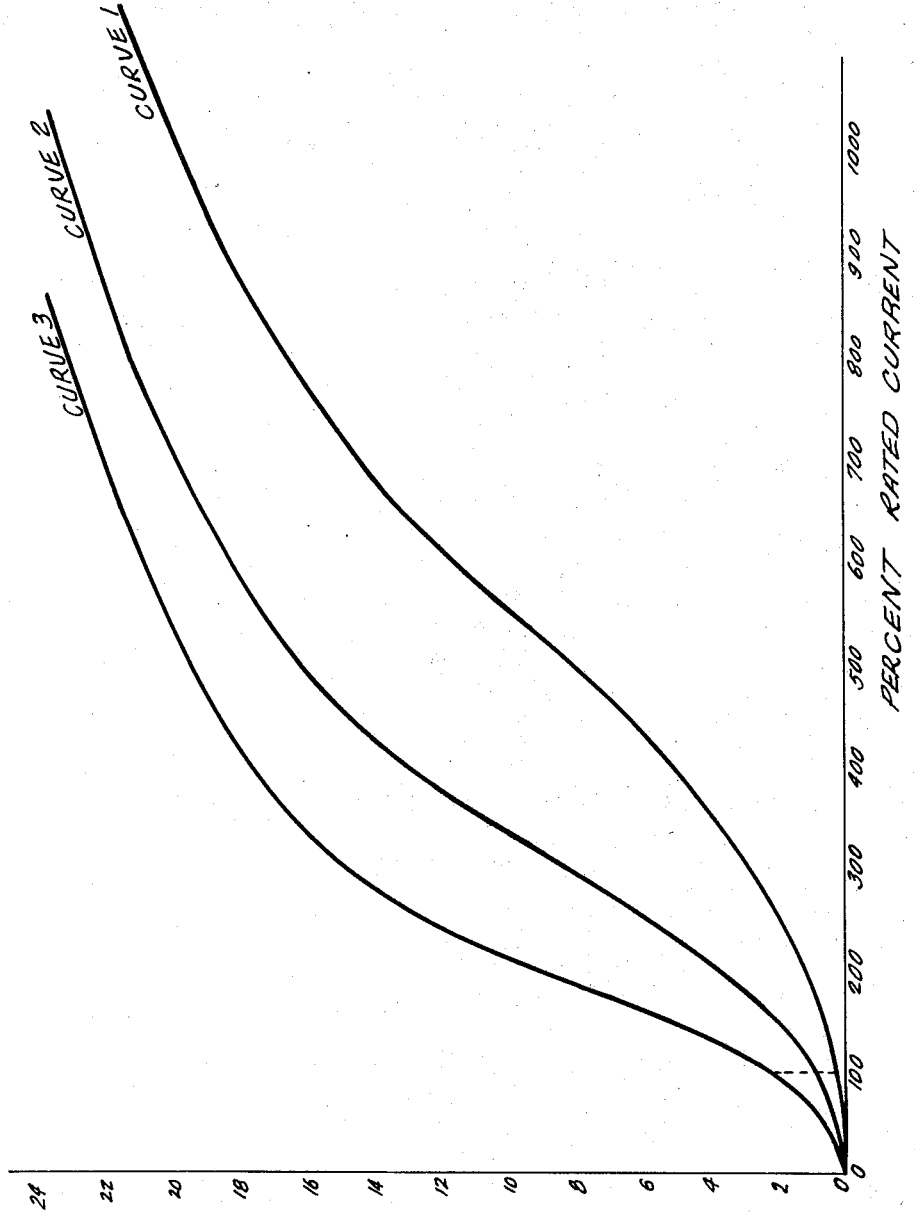

United States Patent Office 3,506,941
Patented Apr. 14, 1970

3,506,941
THERMAL TRIPPING DEVICE FOR CIRCUIT BREAKER
Howard R. Shaffer, Glenside, Pa., assignor, by mesne assignments, to I-T-E Imperial Corporation, Philadelphia, Pa., a corporation of Delaware
Filed Sept. 13, 1967, Ser. No. 667,513
Int. Cl. H01h 61/013, 61/02
U.S. Cl. 337—106                                    7 Claims

ABSTRACT OF THE DISCLOSURE

A directly heated thermal tripping device, comprising a voltage transformer having as its primary conductor a conductor in the circuit being protected, and having a secondary conductor connected with a bimetallic strip that trips the breaker; an armature held away from a magnet core by a biasing means and being drawable to the magnet core around which the primary conductor is wound when the current in the primary conductor exceeds a predetermined level; when the armature is spaced away from the magnet core, the power in the bimetallic strip is at a first level, and when the armature is drawn near or into engagement with the magnet core, there is a step change in the power as the bimetallic strip increases.

---

This invention relates to a directly heated thermal tripping device for a circuit breaker and more particularly to a thermal tripping device employing a variable air gap transformer for varying the current level in the thermal element of the thermal tripping device.

Thermal tripping devices for circuit breakers normally employ a thermal element, such as a bimetallic strip, which is sufficiently heated, when the current level in the circuit being protected by the circuit breaker exceeds a predetermined level, to deflect to engage the tripper bar of the circuit breaker which causes the circuit breaker contacts to separate, thereby opening the circuit being protected to prevent any damage arising from current overload in the circuit.

A thermal element for a circuit breaker should be made sufficiently insensitive so as not to cause the circuit breaker to automatically trip when the breaker is operating at 100% or at less than 100% of its rated load current capacity. Even when the breaker operates for an extended period at 100% of the rated current level, the thermal element should not be so sensitive as to trip the breaker. At the same time, the thermal element should be sufficiently sensitive that when the rated load current capacity of the circuit breaker is exceeded, the thermal element reacts relatively rapidly to trip the breaker. These two requirements for a thermal element are inconsistent, in that if the thermal element is sufficiently insensitive to fail to react at less than 100% of the rated current level of the circuit breaker, it may not react with sufficient rapidity to a current level slightly in excess of the rated current level of the circuit breaker. In addition, ambient temperature variations in the breaker may present a problem because if the thermal element must be sensitive enough to distinguish between current levels slightly above and slightly below the rated current level of the circuit breaker, the thermal element may be strongly affected by small variations in the ambient temperature.

The present invention overcomes the problems arising in the employment of a directly heated deflectable thermal element in a circuit breaker thermal tripping device by having the thermal element connected with the secondary conductor of a transformer, for which transformer the primary conductor is a conductor in the circuit being protected by the circuit breaker.

The primary conductor is adjacent or wrapped around a core member which has a magnetic field induced in its vicinity by the alternating current in the primary conductor. The core member is generally U-shaped with a pair of spaced apart arms. A movable armature is provided which is normally biased away from the core but which is magnetically attracted toward the core by the magnetic field thereabout. The armature magnetically bridges the gap between the arms of the core. This tends to intensify the strength of the magnetic field in the immediate vicinity of the core and armature and thereby increases the current level induced in the secondary conductor of the transformer. The closer the armature is to the core, i.e. the smaller the magnetic reluctance gap between the armature and the core arms, the more intense is the magnetic field in the vicinity of the secondary conductor and the greater is the current induced in the secondary conductor.

The secondary conductor is either adjacent or wound around the armature or a portion of the core and is electrically separate from the primary conductor.

The biasing means which holds the armature at a predetermined distance from the core may be chosen so that the armature will move toward the core when the current level in the primary conductor, i.e. the circuit being protected, is at approximately 100% of the rated current capacity of the circuit breaker. The armature may either be permitted to come into direct contact with the arms of the core, or a non-magnetizable spacing means may be positioned on the legs of the core so that the armature will seat upon the non-magnetizable spacing means, rather than upon the core itself. The latter alternative will have the effect of lessening the strength of the magnetic field in the core and in the vicinity of the armature, thereby generating a lower current level in the secondary conductor.

The thermal element or bimetal is in a series circuit with the secondary conductor. Alternatively, the secondary conductor may be a closed loop with the thermal element being adjacent the secondary conductor and being indirectly heated by the heating of the secondary conductor when current flows through it. The thermal element is heated in proportion to the current level in the secondary conductor. When the current level in the primary conductor increases, the current level in the secondary conductor proportionately increases and the current level in the thermal element proportionately increases.

When the armature, which has been held away from the core, is drawn toward the core of the primary conductor, the strength of the magnetic field in the vicinity of the core and armature will experience a sudden increase out of proportion to the increase in the current level in the primary conductor. This will, in turn, cause the current level in the secondary conductor, and the heat generated in the thermal element, to experience a sudden increase. Further increases in the current level in the primary conductor will cause corresponding increases in the current level in the secondary conductor and in the thermal element power. The further increases will be from the higher current level in the secondary conductor and from the higher thermal element strength level which resulted from the movement of the armature.

Employing a transformer actuated thermal tripping device having a variable magnetic reluctance gap between an armature and the transformer core permits the employment of a thermal element which is sufficiently sensitive to rapidly respond to increases in the current level in the circuit being protected beyond its maximum rated capacity without the thermal element reacting to current levels below the rated capacity of the circuit breaker. Furthermore, the operation of the thermal element will be unaffected by ambient temperature variations since it is not until the current level in the circuit being protected reaches approximately the rated current level of the circuit breaker that the thermal element becomes sufficiently heated to operate the circuit breaker.

The present invention is readily adaptable for use in high current circuit breakers where the thermal element may be chosen so that it causes the circuit breaker to trip in less time than a less sensitive thermal element which must be used with a conventional circuit breaker tripping device.

The present invention provide a step change in the heating current for the circuit breaker thermal element at the maximum rated current level of the circuit breaker, rather than providing a continuous gradual change in the heating current of the thermal element, as is presently the situation.

The present invention also provides a means for easily calibrating a thermal element actuated circuit breaker tripping device by varying the reluctance gap between a transformer core and an armature or by varying the relative ampere-turns level of the primary and secondary conductors of a transformer.

The present invention also provides a way for preventing thermal element or bimetallic strip burnout at high load current levels by allowing saturation of the iron in the transformer core to thereby limit the current in the secondary.

An additional feature which may be used in conjunction with the present invention is an indicating means which is connected with the armature of the transformer to move when the armature moves. The indicating means may indicate movement of the armature merely by its own movement or it may, in turn, actuate a switch which causes a separate indicator to indicate that the armature has moved. It is only after the armature has overcome the biasing force biasing it away from the transformer core and has moved toward the transformer core to close the high reluctance gap that the thermal element begins to heat up sufficient to deflect. Therefore, once the armature moves toward the transformer core as a result of current in excess o fthe maximum rated current of the circuit breaker passing through the circuit being protected, there is a time interval before the circuit breaker will be tripped in which an operator, observing the signal from the indicating means and being alerted to the overload in the circuit being protected, may take steps to correct the overload condition before the circuit breaker is tripped. Especially at high current levels, it is desirable to be able to take steps to correct a current overload before the circuit breaker is tripped, since once the circuit breaker is tripped and the circuit is open, a substantial time interval may elapse and many extra steps may have to be performed before the circuit breaker may be reclosed to complete anew the circuit being protected.

Accordingly, it is a primary object of the present invention to provide a thermal tripping device for a circuit breaker.

It is another object of the present invention to provide a thermal tripping device for a circuit breaker in which the thermal tripping device will be relatively insensitive to current levels below the maximum rated current level of the circuit being protected, but which will be highly responsive to overload current levels in the circuit being protected.

It is a further object of the present invention to provide a thermal tripping device for a circuit breaker where the device will be relatively insensitive to ambient temperature variations.

It is another object of the present invention to provide a thermal tripping device for a circuit breaker, which will permit the circuit breaker to trip in less time than is taken for standard circuit breakers to trip.

It is a further object of the present invention to provide a thermal tripping device for a circuit breaker that can withstand continuous operation at 100% of the rated current capacity of the circuit breaker and still react rapidly when the maximum rated current level is exceeded.

It is a further object of the present invention to provide a thermal tripping device for a circuit breaker that is readily calibrated for various current levels at which the tripping device should react.

It is another object of the present invention to provide a thermal tripping device for a circuit breaker which provides a step change in the level of the current heating the thermal element at the maximum rated current level of the breaker rather than providing a gradual change in the current level.

It is another object of the present invention to provide a thermal tripping device for a circuit breaker, which device employs a transformer and in which transformer the circuit being protected serves as the primary conductor and the circuit which heats the thermal element serves as the secondary conductor.

It is another object of the present invention to provide a thermal tripping device for a circuit breaker which is adapted to be used with an indicating device that indicates that the current in the circuit being protected has exceeded the maximum rated current level of the circuit breaker before the circuit breaker actually trips as a result of the current exceeding this level.

These and other objects of the present invention will become apparent when the following description is considered in conjunction with the accompanying drawings in which:

FIGURE 1 schematically illustrates a thermal tripping device designed in accordance with the teachings of the instant invention;

FIGURE 3 is a graph depicting the thermal element power as a function of the current in the circuit being protected;

Figure 1:
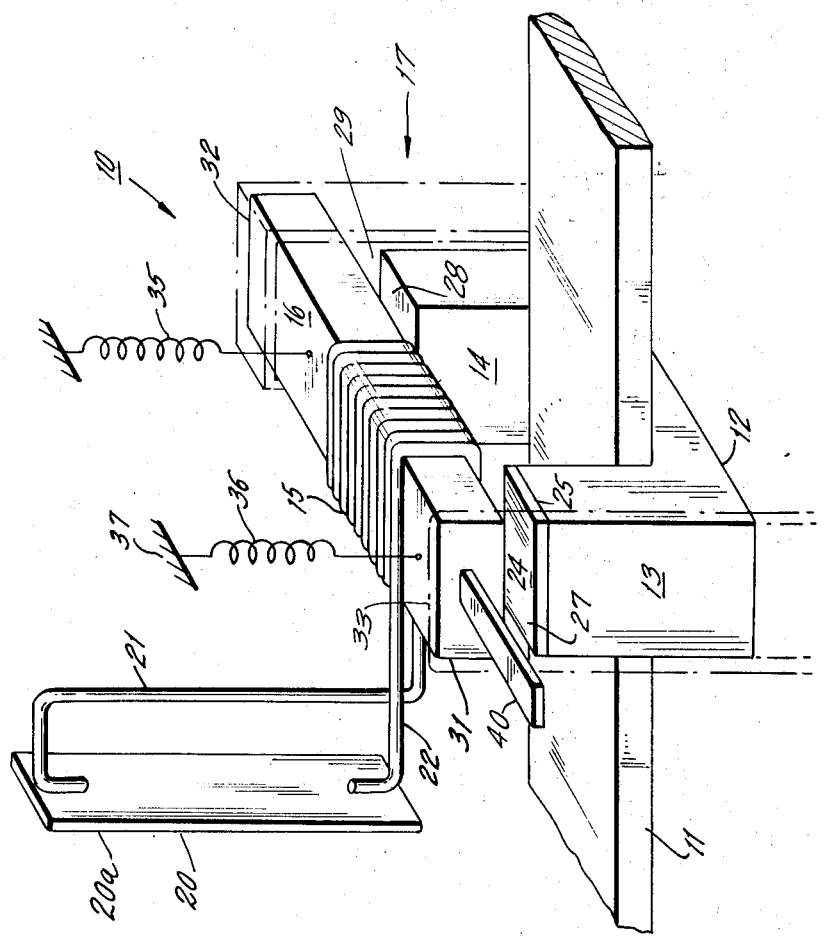
Figure 2:
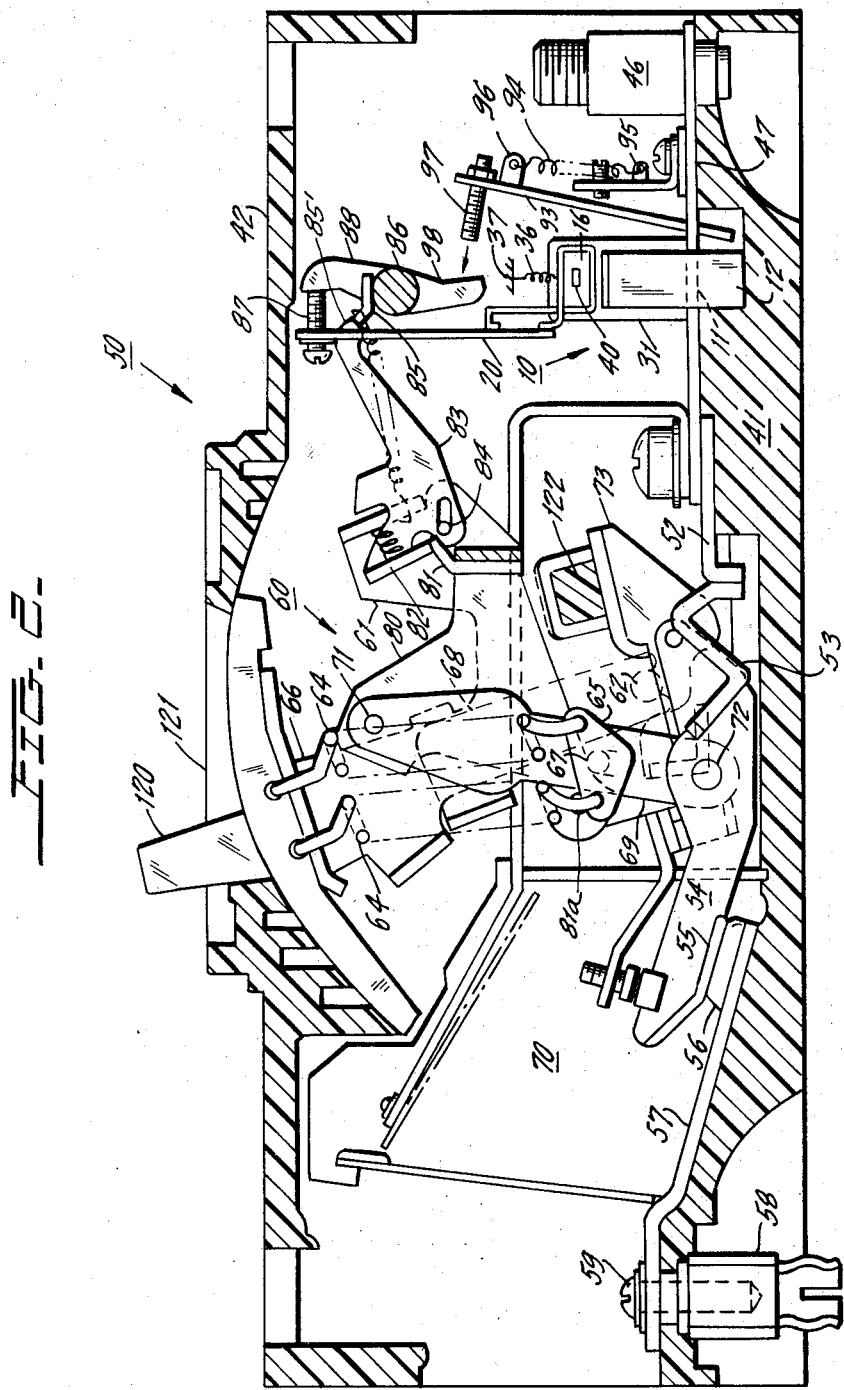
FIGURE 2 is a cross-section through a circuit breaker in which the thermal tripping device of the present invention is mounted.
Figure 2A:
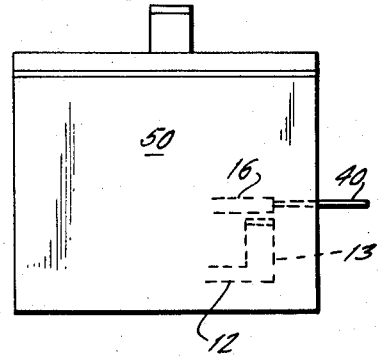
FIGURE 2A is a side view of a circuit breaker showing the indicating means of the present invention.

Referring to FIGURES 1-2A and particularly to FIGURE 1, a thermal tripping device 10 designed in accordance with the instant invention is there shown. A conductor 11 in the circuit to be protected by the circuit breaker, passes adjacent core 12 of the transformer 17. Core 12 may be comprised of any material but is preferably comprised of a readily magnetized material, such as steel. In the vicinity of the core a magnetic field is induced when alternating current flows through the conductor 11. The conductor 11 serves as the primary conductor or primary of transformer 17. While the conductor 11 is shown passing between the arms 13, 14 of the core, the primary conductor 11 may be wrapped about core 12 a number of times.

The transformer also has a secondary conductor or secondary 15. The secondary 15 is shown wrapped about armature 16. Armature 16 is comprised of a material, such as steel, which would be attracted toward the core 12 when a magnetic field is induced in the vicinity of the core 12 by alternating current flowing through conductor 11. While the secondary conductor 15 is shown multi-turn, it may be comprised of any number of turns. The conductor 15 forms a closed electrical series circuit by means of connecting leads 21, 22 with the hereinafter described thermal element 20. As will be described in greater detail below, the armature 16 is movable toward and away from the core 12. Accordingly, the connecting lead 21, 22 may be flexible, in which case the secondary conductor 15 may be tightly wound on the armature 16; or the leads 21, 22 may be rigid, in which case the secondary 15 must be wound sufficiently loosely to allow the armature 16 to move within the coil of secondary 15. While the conductor 15 is shown wound upon armature 16, it may, in the alternative, be wound about core 12 so long as the primary conductor 11 is electrically separated from the secondary conductor 15.

As alternating current flows through primary conductor 11 an alternating magnetic field is induced in and around conductor 11 and core 12, and thereby in secondary conductor 15. This induces a voltage and consequently a current in secondary conductor 15, the current in the secondary winding 15 passing through leads 21, 22 and through thermal element 20.

Arm 13 of core 12 has a non-magnetizable or high reluctance element 24 in a position between its end 25 and armature 16, for reasons to be discussed. In the static condition of FIGURE 1, armature 16 is separated by a high magnetic reluctance gap 27, included in which gap is the element 24, from the end 25 of arm 13. The end 28 of leg 14 of core 12 is separated from armature 16 by a similar high reluctance gap 29.

The thermal element 20 is designed, for reasons to be discussed below, to have its end 20a deflect in one direction, exerting a force in proportion to the increase in temperature in the element and to deflect in the opposite direction in proportion to the decrease of the temperature in the element. The thermal element may be formed of a bimetallic strip comprised of two face-bonded strips of metal, each having different coefficients of expansion, whereby as the bimetal is heated one of the metal strips will expand faster than the other and the bimetallic strip will deflect.

Thermal element 20 is shown connected in series with the conductor 15 and thus is directly heated by the secondary current. The materials of which the thermal element is comprised conduct current through them. Yet, they must have sufficient electrical resistance to enable the thermal element to heat up. If thermal element 20 is electrically separated from a circuit containing secondary conductor 15, i.e. the thermal element is indirectly heated, the conductor in the circuit adjacent the thermal element would have to have sufficient electric resistance to heat up as the current level in conductor 15 increases, and the heat would be transmitted by radiation or thermal conduction to thermal element 20.

Because the gaps 27 and 29 have high magnetic reluctance the current level in the secondary conductor 15 is low and the temperature rise in the thermal element 20 is slight. Hence, the end 20a of bimetal 20 will deflect to an inconsequential extent during the time the armature 16 remains separated from the core 12 by gaps 27, 29.

Armature 16 is supported in a framework which permits it to move toward and away from core 12. The framework may consist of side panels 31 and 32, which engage the ends of the armature 16 and prevent the armature from moving or twisting sideways while permitting it to move toward and away from core 12.

Biasing means 35, 36 join armature 16 to a fixed support 37 and normally bias the armature toward the support. The side panels 31, 32 each have an upper flange 33 which serve to position the armature 16, the distance of gaps 27, 29 away from core 12. The position of flanges 33 will determine the length of gaps 27, 29 and will, therefore, determine the magnetic reluctance across the gaps which will, in turn determine the relationship of the current level in conductor 15, as compared with that in conductor 11. Biasing means 35, 36 are chosen to have a strength, or are adjusted in strength, so that when armature 16 is separated from the upper surfaces 25, 28 of core 12 by magnetic reluctance gaps 27, 29, at current levels in primary conductor 11 below 100% of the rated capacity of the circuit breaker, the magnetic attraction of core 12 on armature 16 is insufficient to move armature 16 against the biasing force of biasing means 35, 36; and at current levels in the primary conductor 11 in excess of 100% of the rated capacity of the circuit breaker, the magnetic attraction upon armature 16 overcomes the biasing force of biasing means 35, 36 and draws armature 16 toward the upper surfaces 25, 28 of legs 13, 14 of core 12.

When armature 16 is drawn toward core 12, the length of gaps 27, 29 and, hence, their magnetic reluctance, decreases, whereby the current level in conductor 15 has a step increase in relation to the current level conductor 11. The maximum step increase occurs if armature 16 moves into direct engagement with the upper surfaces 25, 28 of arms 13, 14. However, if non-magnetizable blocking elements, such as element 24, which may be comprised of plastic, are positioned above surfaces 25, 28, the magnetic reluctance gaps 27, 29 will not be completely eliminated when the armature 16 is attracted toward core 12 and the current level in conductor 15 will not be as greatly increased in relation to the current level in conductor 11, as would be the case if no blocking elements 24 were priovided. The blocking elements 24 may be positioned on one or both of the arms 13, 14 and may be of any height. The greater the height of each of the non-magnetizable blocking elements, the less will be the step increase of the current level in secondary 15 in relation to that in primary 11.

When the armature 16 is drawn toward the core 12, the current in the secondary conductor 15 makes a step increase and the power in the thermal element 20 increases by the square of the increase of the current in the secondary. The surge in the current through the thermal element or in the conductor adjacent the thermal element rapidly heats the thermal element 20 and causes the same to deflect, thereby causing tripping of the circuit breaker in a manner to be described.

Thermal element 20 does not react immediately to the step increase in the current through secondary conductor 15, but requires a short time to heat up before deflecting to cause tripping of the circuit breaker. This delay is useful in conjunction with the indicating means 40 shown in FIGURES 1 and 2a. As will be described in greater detail below, the thermal tripping device of the present invention is positioned within a circuit breaker 50. The indicating means 40 is connected with the armature 16, and when the armature 16 moves toward core 12, the indicating means 40 is actuated and provides a signal that the armature has moved. Because the movement of the armature 16 toward core 12 initiates a step increase in the current through conductor 15, which starts the heating of thermal element 20, the deflection of end 20a of thermal element 20 is delayed until the thermal element has heated. Thus, actuation of indicating means 40 precedes the deflection of thermal element 20 and gives an operator observing indicating means 40 an opportunity to correct overload conditions before the circuit breaker is tripped.

As shown, the indicating means 40 may comprise a projection attached to armature 16 which projects through the wall of the circuit breaker casing and which, by its position, indicates whether the current level in the primary conductor 11 has exceeded the maximum rated current level of the circuit breaker. Alternatively, the armature, when it moves, might actuate a switch which in turn actuates another indicating means, such as a light, in a manner known in the art.

If after the current level in the primary conductor 11 exceeds the maximum rated current level in the circuit breaker and the armature 16 has moved toward the core 12 but before the thermal element 20 has deflected sufficiently to trip the circuit breaker, the current in the primary conductor 11 drops below the maximum rated current level of the circuit breaker, the biasing force of biasing means 35, 36 will overcome the magnetic attraction by core 12 and the armature 16 will return to its open position abutting flanges 33. This will cause a step reduction in the current level in the secondary conductor 15, as compared with the current level in conductor 11 which will reduce the temperature of the thermal element. The thermal element deflects back to its undeflected condition and the circuit breaker is not tripped. The fault current indicating means 40 returns to its normal position when the armature returns to engagement with flanges 33. Thus, if the fault current indicating means indicates that a fault current condition exists in conductor 11 and if the operator viewing the indicating means 40 corrects the fault current condition before the thermal element 20 is heated sufficiently to deflect to trip the circuit breaker, unnecessary tripping of the circuit breaker can be prevented.

Referring to FIGURE 2, the thermal tripping device 10 of the present invention is shown positioned in a circuit breaker 50, such as that shown in U.S. Patent No. 3,155,-802, issued on Nov. 3, 1964 to E. Wortsmann, entitled "U-Shaped Cradle for Circuit Breaker," and assigned to the assignee hereof.

Circuit breaker 50 is typically a three-phase unit including a molded housing comprising base 41 and removable cover 42, partitioned into three parallel elongated chambers with only the center chamber being illustrated. Each chamber houses identical current carrying elements, one for each phase of the circuit breaker, and, in addition, the center chamber houses a single contact operating mechanism 60 for all three phases.

Each of the current paths comprises load terminal connector 46, load terminal strap 47, conductor 11, lug 52, flexible member 53, movable contact arm 54, movable contact 55, stationary contact 56, line terminal strap 57 and terminal connector 58, which is secured by screw 59 to load terminal strap 57. Arc-chute 70 is positioned to receive electric current arcs drawn between cooperating contacts 55, 56 upon their parting.

Mechanism 60 includes a handle 120 which projects through cover opening 121 for manually operating cooperating contacts 55, 56 into and out of engagement. Handle 120 is mounted to the web of inverted U-shaped member 66 which is pivotally mounted at 62 to U-shaped frame 61. A pair of main springs 64 extend from the web of U-shaped member 66 to triangular member 65 which is pivotally mounted to the knee 67 of the toggle-linkage comprising links 68, 69.

The lower end of link 69 is pivotally connected at 72 to bracket 73 which carries contact arms 54. The upper end of link 68 is pivoted at 71 to latchable cradle 80. Transverse tie bar 122 extends through all of the three housing compartments and carries the brackets 73 of all three phases so that the movable contacts 55 of all three phases are simultaneously operated into and out of engagement with their cooperating contacts 56.

Cradle 80 carries latch member 81 engageable with portion 82 of auxiliary latch member 83 which is pivoted to frame 61 at 84. Latchtip 85' of auxiliary latch member 83 is engageable with main latch member 85 carried by transversely extending common tripper bar 86. When tripper bar 86 is pivoted clockwise, latchtip 85' is released, in turn releasing latch member 81 thereby permitting cradle 80 to pivot counter-clockwise about its pivot 81a to collapse toggle 68, 69 so that springs 64 separate contacts 55, 56.

Turning to the mounting of the tripping device 10 in the circuit breaker 50, the core 12 of the circuit breaker is positioned on the base 41. Positioning elements 31 and 32 (not shown) for armature 16 are similarly mounted on base 41. The bimetallic thermal element 20 is supported, by means not shown, in a position such that the adjustable screw 87 through the end of the element engages the upward extension 88 of tripper bar 86. Adjustment of the position of screw 87 determines the extent of clockwise deflection of element 20 that is required before the screw 87 engages the extension 88 of bar 86 and causes the bar to rotate, thereby initiating tripping of the breaker.

The magnet core 12 may also serve as the magnet for attracting the instantaneous trip armature 93 which is pivoted at its lower end and is normally biased in a clockwise direction by spring 94. One end of spring 94 is connected to bracket lug 95 and the other end is connected to lug 96 of armature 93. When a very high fault current passes through conductor 11, the magnetic field induced around magnet core 12 attracts armature 93 and the adjusting screw 97 engages the downward extension 98 of tripper bar 86 to cause clockwise rotation of the tripper bar which causes tripping of the breaker.

Referring to FIGURE 3, curves 1, 2 and 3 depict the thermal element power as a function of the current in the primary conductor, in percent of the rated current of the circuit breaker using a specific design case. These curves can be altered by varying the relative number of turns in the conductors of the current transformer, by changing the component materials, thickness and other characteristics of the thermal element, or by changing the magnetic reluctance gap between the armature 16 and the core 12.

Curve 1 illustrates the thermal element power curve if the armature 16 is maintained in the open position (illustrated in FIGURE 1) with the armature seated against the flanges 33. Curve 2 illustrates the thermal element power curve if the armature 16 is spaced by a first magnetic reluctance gap from the core 12, the length of the gap being defined by the thickness of the non-magnetic elements 24 between the core 12 and the armature 16. Curve 3 shows the thermal element power curve if the armature 16 is permitted to come into direct contact with the ends 25, 28 of arms 13, 14. As is apparent, the magnetic reluctance gap between armature 16 and core 12 is longest for curve 1, is shorter for curve 2 and is nonexistent for curve 3.

Assume that non-magnetic elements 24 have been positioned on the ends 25, 28 of core arms 13, 14 so that when the armature has moved toward core 12, the thermal element power curve is curve 2. As the current in the primary conductor 11 is increased from 0 to the rated current of the circuit breaker, the armature 16 is biased by means 35, 36 against flanges 33 and the thermal element power follows curve 1. At and above 100% of the rated current of the circuit breaker, the armature is magnetically attracted by core 12 against the force of biasing means 35, 36 toward and into engagement with the elements 24 on core 12. The thermal element power immediately steps from curve 1 to curve 2 and thereafter follows curve 2. As shown on the graph, there is an increase of approximately four times in the thermal element power.

If a greater power step-up is required to give a faster response, then the elements 24 are made to have a lesser thickness or are removed altogether. Now, when the armature is attracted to core 12 at 100% of the rated current level of the circuit breaker, the thermal element power jumps from curve 1 all the way to curve 3 and the thermal element power has a step increase of approximately eleven times.

From the foregoing it can be readily seen that the element chosen for the tripping device of the present invention can be extremely sensitive and respond rapidly in the vicinity of and above 100% of the rated current level of the circuit breaker because of the step change in the power level to the element and an operator need not be concerned about the inaccuracies in the calibration of the thermal element at current levels below 100% of the rated current level of the circuit breaker. Furthermore, the circuit breaker may be operated at or near its maximum rated current level for an indefinite period, without the thermal element being heated sufficiently to trip the circuit breaker even though the ambient temperature varies.

Figure 4:
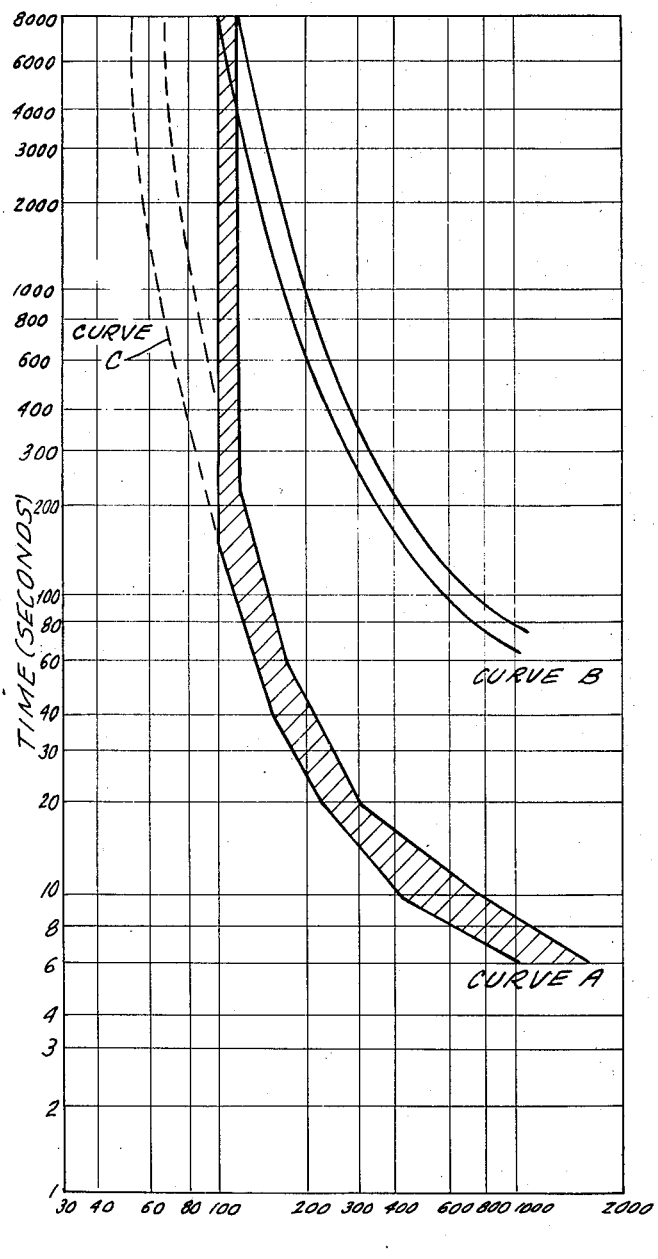
FIGURE 4 is a graph depicting the time until the circuit breaker trips as a function of the rated current of the circuit breaker, for a conventional thermal tripping device and for a thermal tripping device designed in accordance with the present invention.

Refer to FIGURE 4 which depicts the tripping time for the circuit breaker as a function of the rated current of the circuit breaker, stated in terms of a percent of the maximum rated current of the circuit breaker.

Curve A indicates the predicted range of response for a circuit breaker designed in accordance with the present invention. Curve B indicates the response of a standard thermally tripped circuit breaker having the same rated current capacity. For an example of a standard circuit breaker employing a standard tripping device, see the aforementioned U.S. Patent No. 3,155,802. Curve C depicts the response pattern of the circuit breaker of the present invention if the armature is held continuously in a closed position against the magnet core.

Comparing curve A and curve B at 100% of the rated current level of the circuit breaker, the thermal elements of a standard circuit breaker and of the instant invention must be calibrated to hold 100% rated current continuously without tripping the circuit breakers at a given ambient temperature. The thermal element of a standard breaker is subjected to the heating of the 100% rated current continuously and is calibrated in such a way that it is nearly tripping the circuit breaker. At this point, any increase in temperature, such as ambient changes, will result in the standard circuit breaker being tripped. However, the thermal element of the present invention is not subjected to the high heating effect of 100% rated current since the armature is away from the magnet core and the circuit breaker will tolerate 100% of the rated current capacity for an indefinite period without tripping the circuit breaker because heating of the thermal element is minimal. Even increases of ambient temperature, within reason, will not cause the thermal element of the instant invention to trip the circuit breaker.

Comparing curves A and B at current levels above 100% of the rated current capacity of the circuit breaker, a thermal element which may be used in conjunction with the present invention is much more sensitive and responds more rapidly than a thermal element for a standard circuit breaker at the same rating. This is because the thermal element of the present invention can be subjected to much higher levels at any overcurrent value than the thermal element of a standard circuit breaker since the heating of the thermal element of the present invention is minimal at 100% rated current but has a large step change in heating level above 100% rated current. On the other hand, the thermal element of a standard breaker does not have the step change in heating level and, therefore, the heating is proportional to circuit current at all times. Since the breaker must be calibrated to hold 100% rated current indefinitely, this limits the response time of a standard circuit breaker. Thus, circuit breakers designed in accordance with the teachings hereof can be designed to more rapidly react to low overload currents and to more rapidly trip the circuit breaker to prevent damage from the overload.

At current levels below 100% of the rated current capacity of the circuit breaker, neither a circuit breaker designed in accordance with the present invention nor a standard circuit breaker should trip at a given ambient temperature. However, at higher ambient temperatures, a standard breaker may trip at current levels less than 100% of the rated current capacity since the thermal element may be sufficiently heated by the circuit current and the ambient temperatures. However, a thermal element of the present invention would require an extremely large ambient temperature increase since the heating of the thermal element is minimal whenever the circuit current is less than 100% of the rated current capacity of the circuit breaker. Thus, the thermal tripping device of the present invention maintains the 100% calibration point of its rated current capacity even though the ambient temperatures deviate within a reasonable amount.

Curve C should be noted in this connection as a matter of interest. The thermal element 20 used in conjunction with the present invention may be chosen to be so sensitive that it would trip the circuit breaker at current levels well below the maximum rated current level of the circuit breaker if the armature 16 were near the core 12. This shows that employment of the tripping device designed in accordance with the present invention permits the use of a thermal element which is very sensitive and, hence, one which reacts much more rapidly to overload currents through the circuit being protected.

There has just been shown a thermal tripping device for a circuit breaker which is sensitive enough to respond rapidly to small overload currents, but which will not trip the breaker at current levels at or just below the maximum rated current capacity of the breaker during operation over an extended period.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A thermal tripping device for a circuit breaker comprising, cooperating contacts which are engageable to complete the circuit being protected and are separable to open the circuit being protected; a tripper connected with said contacts for tripping apart such contacts;

and a tripping device for initiating tripping movement of said tripper and being connected therewith; said tripping device comprising a deflectable thermal element which deflects upon being heated a predetermined extent due to a predetermined increase in the current level in the circuit being protected; said thermal element being operatively connected to said tripper;

a transformer; the circuit being protected beng electromagnetically connected with the transformer so as to serve as the primary conductor for said transformer;

said transformer having a secondary conductor, said thermal element being connected with the secondary conductor of said transformer to be heated by the current in said secondary conductor;

said transformer being comprised of a core and an armature, said armature including said secondary conductor; said primary conductor being adjacent said core;

said armature being spaced away from and in the vicinity of said core and being movable toward said core when the current level in said primary conductor exceeds a predetermined level.

2. In the thermal tripping device of claim 1, the improvement further comprising, a biasing means connected with said armature for biasing said armature away from said core.

3. In the thermal tripping device of claim 1, said armature being comprised of magnetizable material; said core being magnetized by current flowing through said primary conductor for attracting said armature.

4. In the thermal tripping device of claim 3, the improvement further comprising, a biasing means connected with said armature for biasing said armature away from said core.

5. In the thermal tripping device of claim 4, the improvement further comprising, an indicating means connected with said armature for indicating when said armature has moved toward said core.

6. In the thermal tripping device of claim 3, the improvement further comprising, said thermal element being in an electrical circuit with said secondary conductor.

7. In the thermal tripping device of claim 6, the improvement further comprising, said secondary conductor being adjacent said armature.

References Cited

UNITED STATES PATENTS 2,939,929  6/1960  Hobson _____ 337—54 X
1,262,645  4/1918  Connor et al. _____ 335—106

B. A. GILHEANY, Primary Examiner
H. B. GILSON, Assistant Examiner

U.S. Cl. X.R.

337—54 X